United States Patent
Howell et al.

(10) Patent No.: US 11,809,585 B2
(45) Date of Patent: Nov. 7, 2023

(54) SYSTEMS AND METHODS FOR COMPUTING DATABASE INTERACTIONS AND EVALUATING INTERACTION PARAMETERS

(71) Applicant: TD Ameritrade IP Company, Inc., Omaha, NE (US)

(72) Inventors: Randal Scott Howell, Omaha, NE (US); Eric John Hains, West Orange, NJ (US); Justin Wayne Webster, Omaha, NE (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 0 days.

(21) Appl. No.: 17/964,186

(22) Filed: Oct. 12, 2022

(65) Prior Publication Data

US 2023/0081022 A1    Mar. 16, 2023

Related U.S. Application Data

(63) Continuation of application No. 16/588,624, filed on Sep. 30, 2019, now Pat. No. 11,514,179.

(51) Int. Cl.
| | | |
|---|---|---|
| *G06F 21/62* | (2013.01) | |
| *G06F 11/32* | (2006.01) | |
| *G06N 20/00* | (2019.01) | |
| *G06F 18/22* | (2023.01) | |

(52) U.S. Cl.
CPC ........ *G06F 21/6218* (2013.01); *G06F 11/327* (2013.01); *G06F 18/22* (2023.01); *G06N 20/00* (2019.01)

(58) Field of Classification Search
CPC .... G06F 21/6218; G06F 11/327; G06F 18/22; G06N 20/00
See application file for complete search history.

(56) References Cited

U.S. PATENT DOCUMENTS

| | | | |
|---|---|---|---|
| 9,367,809 | B2 | 6/2016 | Puri et al. |
| 10,567,402 | B1 * | 2/2020 | Comeaux ............... G06N 3/086 |
| 2011/0296003 | A1 | 12/2011 | McCann et al. |
| 2014/0082691 | A1 | 3/2014 | Warn et al. |
| 2015/0180896 | A1 | 6/2015 | Higbee et al. |
| 2015/0229664 | A1 | 8/2015 | Hawthorn et al. |
| 2016/0292599 | A1 | 10/2016 | Andrews et al. |

(Continued)

*Primary Examiner* — Abiy Getachew
(74) *Attorney, Agent, or Firm* — Harness, Dickey & Pierce, P.L.C.

(57) ABSTRACT

A method includes storing a test database of tests and corresponding test rules, storing a user information database, storing a profile database, and storing a threshold database including thresholds corresponding to test scores and similarity scores. The method includes, in response to receiving interaction parameters of an interaction performed by a user, identifying a set of tests based on the interaction parameters. The method includes, for each of the set of tests: calculating a score using user data of the user, corresponding test rules, and the interaction parameters; adjusting the score based on the user's profile; obtaining a threshold corresponding to the identified test; and, in response to the score exceeding the threshold, categorizing the interaction within a first category. The method also includes generating and transmitting an alert in response to the interaction being categorized within the first category.

20 Claims, 6 Drawing Sheets

(56) References Cited

U.S. PATENT DOCUMENTS

2016/0344762 A1* 11/2016 Jou ..................... G06F 21/577
2019/0197442 A1*  6/2019 Lu ...................... G06Q 20/4016
2021/0097191 A1*  4/2021 Howell ............... G06F 21/6218

* cited by examiner

SYSTEMS AND METHODS FOR COMPUTING DATABASE INTERACTIONS AND EVALUATING INTERACTION PARAMETERS

RELATED APPLICATIONS

This application is a continuation of U.S. patent application Ser. No. 16/588,624, filed Sep. 30, 2019, which is incorporated herein by reference for all purposes.

FIELD

The present disclosure relates to systems and methods for analyzing database entries and more particularly to systems and methods for categorizing user database interactions.

BACKGROUND

Users interact with entities, particularly financial entities, on a regular basis via a website, phone system, remote device (automated teller machine), in-person, etc. While each user interaction may not involve a transaction, each user interaction has an amount of risk involved. In order to reduce intolerable risk as well as fraudulent user interactions, user interactions may be reviewed by an analyst or individual associated with the entity.

Manually reviewing user interactions is time-consuming and can result in error when a review group of user interactions is large. Manual review can also result in a poor user experience with the entity if a particular user interaction is held in review or even canceled, for example, opening an account or transferring money, until the analyst approves the user interaction.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores a test database including a plurality of tests and corresponding test rules. The memory stores a user information database including user data. The memory stores a profile database including a profile for each user. Each profile includes corresponding user scores. The memory stores a threshold database including a plurality of thresholds corresponding to test scores and similarity scores. The memory stores instructions that, upon execution, cause the at least one processor to, in response to receiving interaction parameters of an interaction performed by a user, identify a set of tests of the plurality of tests to perform based on the interaction parameters. The instructions also include, for each identified test of the set of tests, obtaining corresponding test rules, user data corresponding to the user, and a profile of the user; calculating a score using the corresponding test rules, user data of the user, and the interaction parameters; adjusting the score based on the profile of the user; obtaining a threshold corresponding to the identified test; and, in response to the score exceeding the threshold, categorizing the interaction within a first category. The instructions include, in response to the interaction being categorized within the first category, generating and transmitting an alert.

In other features, the instructions, upon execution, cause the at least one processor to, in response to the score being within a predetermined range of the threshold, categorize the interaction within a second category. In other features, the instructions, upon execution, cause the at least one processor to update the profile corresponding to the user to incorporate the score.

In other features, the memory stores a pattern database including known patterns constructed from interaction parameters categorized within the first category. The instructions, upon execution, cause the at least one processor to match characteristics of a known pattern of the known patterns to the interaction parameters to recognize a pattern of the known patterns in the interaction parameters; calculate a similarity score for the recognized pattern based on pattern rules; adjust the similarity score based on the profile of the user; obtain a similarity threshold corresponding to the recognized pattern; and, in response to the similarity score exceeding the similarity threshold, categorize the interaction within the first category. The similarity score is based on a similarity between the interaction parameters and the recognized pattern.

In other features, the instructions, upon execution, cause the at least one processor to, in response to the interaction being categorized within the first category and receiving interaction feedback indicating the interaction is fraudulent, update the known patterns based on a machine learning algorithm guided by the interaction parameters. In other features, the known patterns are constructed by a machine learning algorithm. The machine learning algorithm is trained using historical user interactions that are confirmed as being categorized within the first category. In other features, the instructions, upon execution, cause the at least one processor to store the interaction and interaction parameters in a review database for manual review and pause the interaction until manual review is complete.

In other features, the interaction parameters include metadata that indicates a unique device that initiated a transaction and a geographical location of the unique device upon initiation of the transaction. In other features, the instructions, upon execution, cause the at least one processor to review interaction parameters for a plurality of interactions to identify one or more anomalies among the plurality of interactions. In other features, the user scores included in each user profile are computed from corresponding historical user interactions.

A method includes storing a test database including a plurality of tests and corresponding test rules, storing a user information database including user data, storing a profile database including a profile for each user, and storing a threshold database including a plurality of thresholds corresponding to test scores and similarity scores. Each profile includes corresponding user scores. The method includes, in response to receiving interaction parameters of an interaction performed by a user, identifying a set of tests of the plurality of tests to perform based on the interaction parameters. The method includes, for each identified test of the set of tests: obtaining corresponding test rules, user data corresponding to the user, and a profile of the user; calculating a score using the corresponding test rules, user data of the user, and the interaction parameters; adjusting the score based on the profile of the user; obtaining a threshold corresponding to the identified test; and in response to the score exceeding the threshold, categorizing the interaction within a first category. The method also includes, in response to receiving the interaction parameters, generating and transmitting an alert in response to the interaction being categorized within the first category.

In other features, the method includes, in response to the score being within a predetermined range of the threshold, categorizing the interaction within a second category. In other features, the method includes updating the profile corresponding to the user to incorporate the score. In other features, the method includes storing a pattern database including known patterns constructed from interaction parameters categorized within the first category. The method includes matching characteristics of a known pattern of the known patterns to the interaction parameters to recognize a pattern of the known patterns in the interaction parameters. The method includes calculating a similarity score for the recognized pattern based on pattern rules. The similarity score is based on a similarity between the interaction parameters and the recognized pattern. The method includes adjusting the similarity score based on the profile of the user. The method includes obtaining a similarity threshold corresponding to the recognized pattern. The method includes, in response to the similarity score exceeding the similarity threshold, categorizing the interaction within the first category.

In other features, the method includes, in response to the interaction being categorized within the first category and receiving interaction feedback indicating the interaction is fraudulent, updating the known patterns based on a machine learning algorithm guided by the interaction parameters. In other features, the method includes constructing the known patterns using a machine learning algorithm. The machine learning algorithm is trained using historical user interactions that are confirmed as being categorized within the first category. In other features, the method includes storing the interaction and interaction parameters in a review database for manual review and pausing the interaction until manual review is complete.

In other features, the interaction parameters include metadata that indicates (i) a unique device that initiated a transaction and (ii) a geographical location of the unique device upon initiation of the transaction. In other features, the method includes reviewing interaction parameters for a plurality of interactions to identify one or more anomalies among the plurality of interactions. In other features, the method includes computing the user scores included in each user profile from corresponding historical user interactions.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
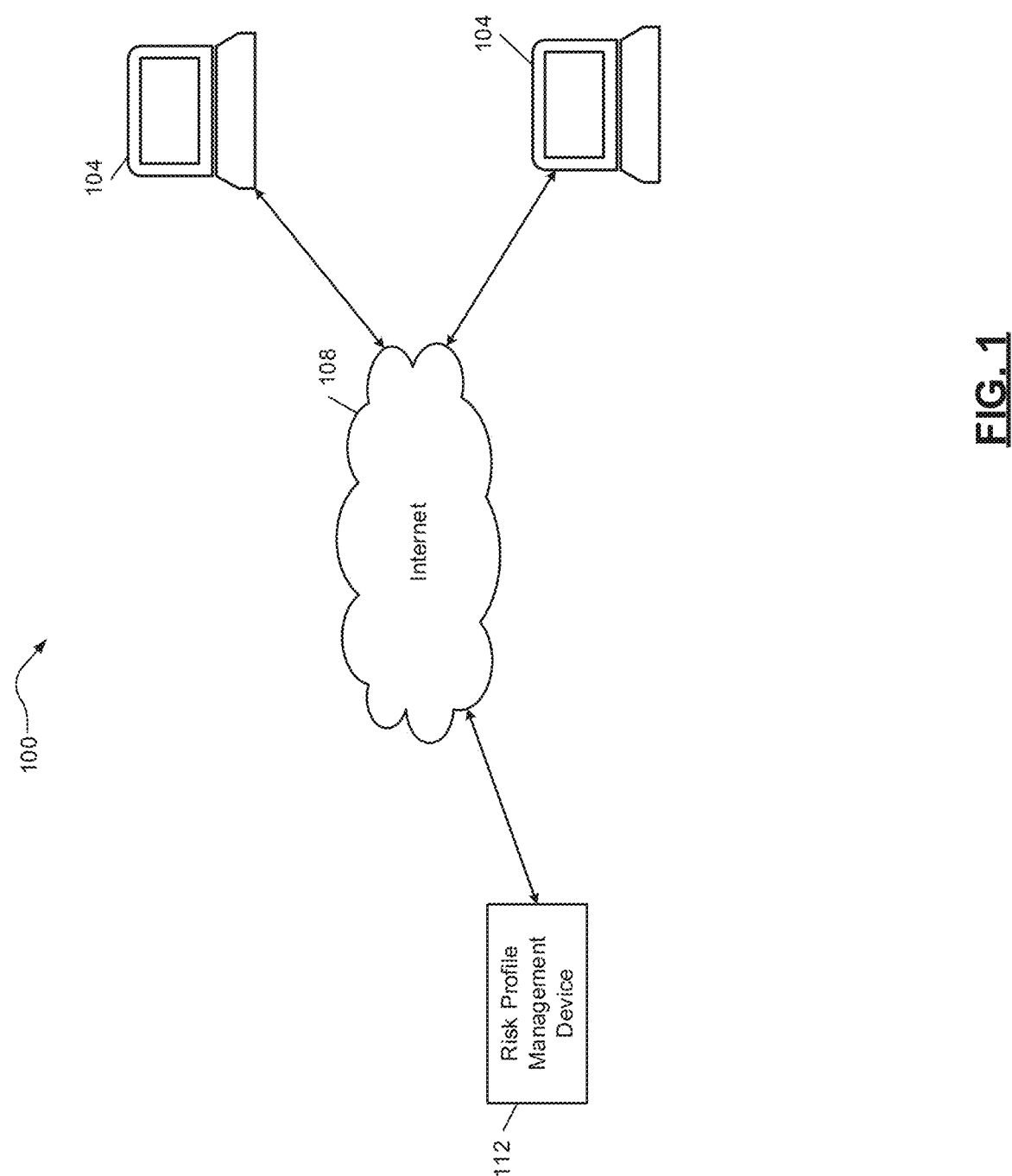
FIG. 1 is a high-level example block diagram of a risk profile management system.

To maintain an inclusive and robust analysis of users, profiles are maintained for each user that are a reflection of the corresponding user's interaction history with an entity. For example, one type of profile maintained for each user is a risk profile. A risk profile includes a set of scores or values and counters resulting from the corresponding user's interactions with the entity that maintains the risk profile. User interactions can include (i) account administration in any medium, such as online, telephone, etc., including financial transfers, account opening, purchase of stocks, etc., (ii) user outreach, including user questions or comments, (iii) click stream data performed by the user, etc. Essentially, any interaction the user has with the entity can be monitored and incorporated into the user's risk profile by assessing interaction parameters of each user interaction according to a set of risk tests and comparing how similar the user interactions are to known patterns that are intolerable.

Interaction parameters of a user interaction may include account parameters (such as, total value, type, transaction frequency, etc.), interaction frequency, interaction method (such as, performing transactions over the phone versus online, calling frequency, etc.), etc. Each user interaction is monitored and analyzed using machine learning algorithms for pattern recognition, supervised and unsupervised, and risk test application. Further, each interaction is evaluated to determine a likelihood that the interaction does not pose an intolerable risk.

To identify what risks a given interaction may pose, a risk profile management device computes a set of risk scores and a set of similarity scores (collectively "scores"). The risk profile management device adjusts the scores based on the corresponding user risk profile. To determine the set of risk scores, the risk profile management device analyzes the interaction parameters according to rules associated with a set of risk tests. The set of risk tests correspond to types of risks user interactions present to the entity. The risk profile management device compares the set of risk scores to corresponding thresholds.

Further, the risk profile management device compares user interactions to known patterns. The known patterns are constructed from interaction parameters of past user interactions that were beyond a tolerable risk or resulted in fraud. Historical interaction parameters are used to train a machine learning algorithm and to construct the known patterns. Then, the risk profile management device determines a similarity between the recognized known patterns by calculating, for example, the set of similarity scores, based on certain pattern rules. The risk profile of the corresponding user may be updated based on how similar their interactions are to known, risky patterns, which adjusts the risk score, resulting in a higher risk profile or a lower risk profile.

Based on the computed scores, each user interaction is categorized within a set of categories. For example, a first category may correspond to a high risk, a second category may correspond to a moderate risk, and a third category may correspond to a low risk. When a user interaction is categorized as high risk, an alert is generated and the user interaction is stored for manual review. The user interaction may be paused or canceled depending on the interaction type and other parameters. For example, if the user interaction involves transferring a threshold amount of money to a foreign, unknown account and is categorized as high risk, the user interaction may be canceled.

If the user interaction is categorized as moderate risk, the user interaction is flagged and stored for manual review. Otherwise, if the user interaction is categorized as low risk, the system or device determines that review and/or alerting is unnecessary.

Additionally, the risk profiles, thresholds, and known patterns are updated automatically after each user interaction. In various implementations, the thresholds are adjusted when a user interaction indicates a high or moderate risk to ensure that the thresholds are updated according to the scores being calculated and recent user interactions. This updating ensures high risk activity is identified and that the system does not identify too many false positives to be burdensome. The known patterns database may be updated when a user interaction is categorized as high risk. The high risk interaction parameters may be analyzed by the machine learning algorithm to identify risky patterns. In various implementations, the risk profiles are adjusted with each user interaction to reflect the user's risk.

FIG. 1 is a high-level example block diagram of a risk profile management system 100. The risk profile management system 100 includes user devices 104. The user devices 104 may be used by a user to interact with a website (perform user interactions) operated by an entity, such as logging in to the user's account of a financial institution. The user devices 104 may also be operated by an analyst associated with the entity to receive alerts or review flagged user interactions. The user devices 104 may access such information or interact with websites via the Internet 108. A risk profile management device 112 receives interaction parameters of a user interaction performed on one of the user devices 104 via the Internet 108. In various implementations, the risk profile management device 112 may be connected to one or more of the user devices 104 via an internal network connection.

The risk profile management device 112 is configured to update and maintain user risk profiles and determine whether user interactions present an intolerable amount of risk by alerting the entity and/or analyst or flagging user interactions for review. In various implementations, the user risk profiles (stored in or external to the risk profile management device 112) may be accessed and displayed to analysts upon request. For example, an analyst may obtain the user risk profile of a user who is calling in for customer support to determine the amount of risk that user's history indicates.

Figure 2:
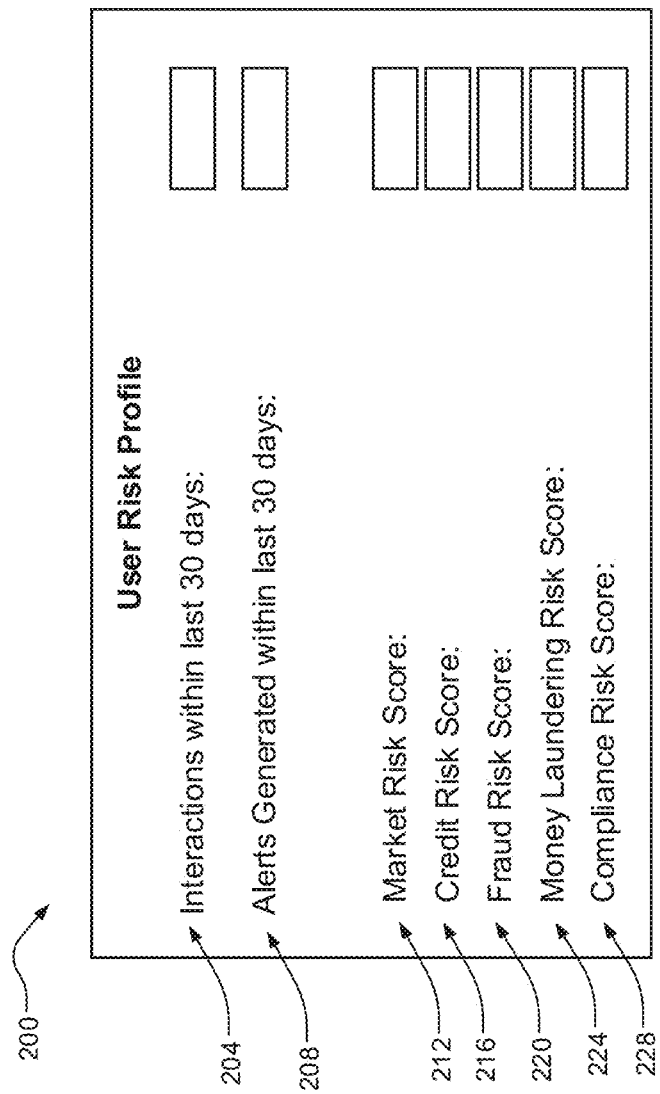
FIG. 2 is a representation of an example user interface presenting an example user risk profile according to the principles of the present disclosure.

FIG. 2 is a representation of an example user interface presenting an example user risk profile 200 according to the principles of the present disclosure. The user risk profile 200 may include an interaction counter 204 that indicates how many interactions have occurred within the last 30 days and an alert counter 208 that indicates a number of alerts generated within the last 30 days. Additionally, the user risk profile may include a market risk score 212, a credit risk score 216, a fraud risk score 220, a money laundering risk score 224, and a compliance risk score 228. Each risk score indicates an amount of risk or exposure that the user presents to the entity. The risk scores may be based on the specific interaction or condition being analyzed at that time.

The user risk profile may provide a statistical description of the user's profile for the given interaction of concern to give a company representative more insight when conducting a manual review of the user's account or a client interaction. One use case for the user risk profile is to permit low-risk interactions by clients without manual intervention. While global policies or longstanding practice may prohibit a certain transaction or class of transaction, a client's risk profile may be assessed to permit such a transaction in certain cases. For example, the transaction may be permitted based on a sufficiently low market risk, credit risk, anti-money-laundering risk, fraud risk, etc. This reduces the cost and delay of manual review and improves the client's experience. In addition, the manual review resources can be targeted to higher risk activities for a better return on investment of those resources.

Figure 3:
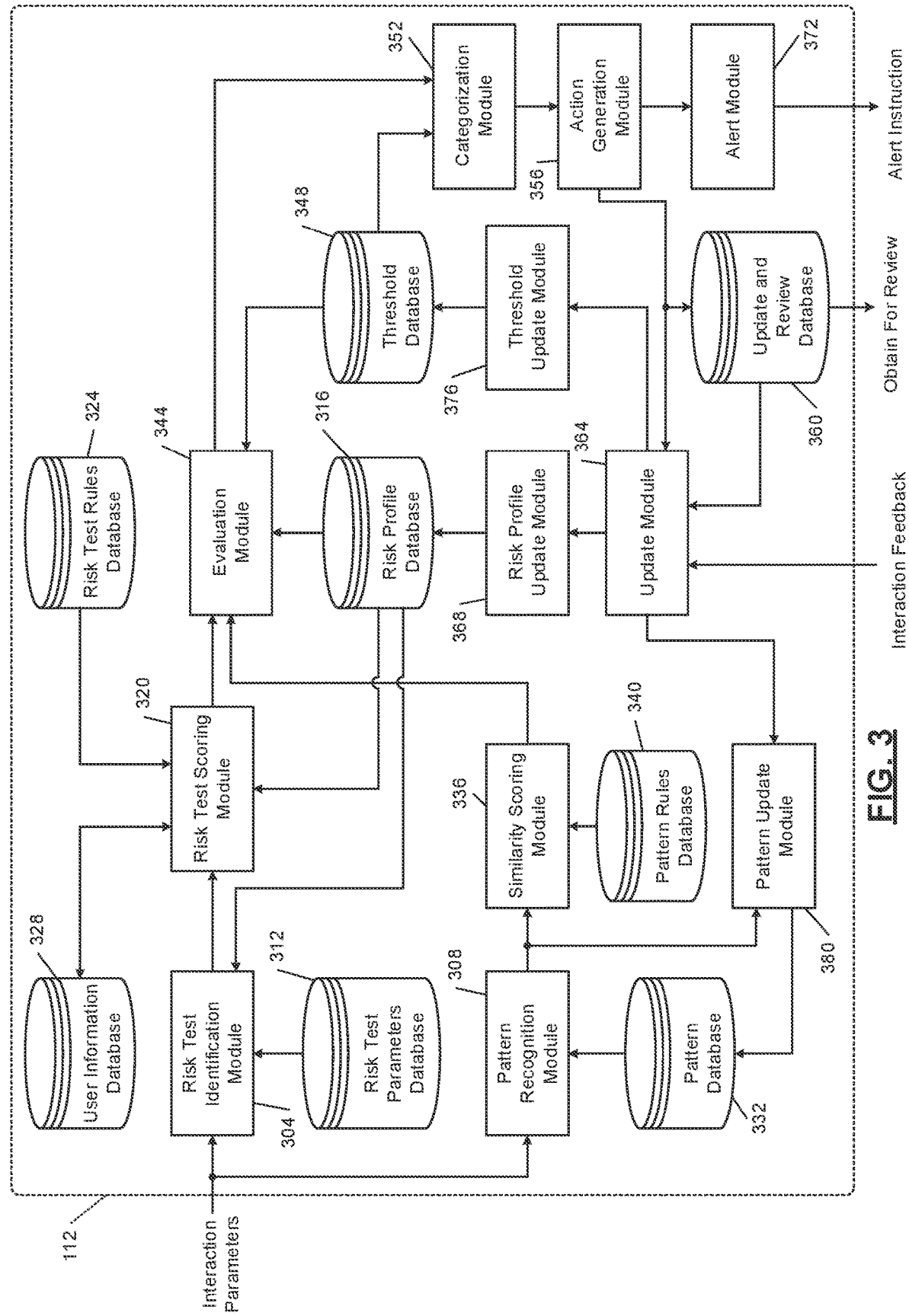
FIG. 3 is a functional block diagram of an example risk profile management device according to the principles of the present disclosure.

FIG. 3 is a functional block diagram of an example risk profile management device 112 according to principles of the present disclosure. As described above, the risk profile management device 112 receives interaction parameters of a user interaction. The user interaction may be performed via a web portal on a personal computing device, via a phone call that is logged by the entity's phone system, etc. The interaction parameters include user identifying information (if available), interaction type, etc. While described as within the risk profile management device 112, each database described may be excluded from the risk profile management device 112 and, instead, accessed via the Internet.

A risk test identification module 304 and a pattern recognition module 308 receive the interaction parameters. The risk test identification module 304 identifies which risk tests should be performed on the user interaction based on the interaction parameters. While not exhaustive, the risk tests that may be performed include a market risk test, a credit risk test, a fraud risk test, a money laundering risk test, and a compliance risk test. The risk test identification module 304 receives the interaction parameters and identifies which risk tests are relevant to the user interaction. For example, the market risk test is not relevant to the user interaction if the user is transferring money from their account to another account and investments are not held in either account—therefore no market risk exists. Therefore, if the user interaction includes adding money to or removing money from an account, the risk test identification module 304 would not identify the market risk test.

The risk test identification module 304 obtains risk test parameters from a risk test parameter database 312 and a user risk profile from a risk profile database 316. The risk test identification module 304 identifies which risk tests to compute based on the risk test parameters included in the risk test parameter database 312 as well as the user risk profile associated with the user performing the user interaction. In various implementations, the risk test parameters may include which interaction parameters should be present during a user interaction to determine that a corresponding risk test should be computed. Additionally or alternatively, the risk test parameters may include threshold values for certain interaction parameters. For example, certain risk tests may be triggered by a user interaction exceeding a monetary transaction limit. In a further example, a user with a high risk profile may be subject to more risk testing than a lower risk profile.

The risk profile database 316 stores a risk profile for each user. The risk profiles include aggregated or averaged risk scores for each category of risk based on historical interactions of the associated user. Further, the risk profiles also may include frequency data regarding an amount of interactions performed by the user as well as a frequency of phone calls conducted with the user, frequency of trades completed, etc. The risk profiles may also incorporate metadata of an interaction, such as unique device identifiers (for example, a fingerprint based on installed applications, operating system version, IMEI, sensor parameters, etc.), phone number, and geographic location, to allow for anomaly detection.

Additionally, the risk profiles may include user account information relevant to risk exposure, such as a number of accounts opened, a number of account open attempts, a number of large transaction requests, etc.

Once the risk tests are identified, the risk test scoring module 320 receives the identified risk tests to compute corresponding risk scores of the identified risk tests. The risk testing scoring module 320 obtains the corresponding risk test rules from a risk test rules database 324 along with data associated with the user to perform the risk tests from a user information database 328. The risk test rules database 324 stores, for each risk test, a plurality of business rules and methods to calculate the risk test scores.

For example, the market risk test may include risk factors such as risk pricing. The market risk test may involve determining the risk of negotiated margin rates and commissions. The credit risk test may include risk factors such as deposit return risk and loss given default. The credit risk test may involve determining bad debit on a margin loan and bad debit on a duplicate disbursement. The fraud risk test may include risk factors for third party fraud as well as first party fraud. The fraud risk test may involve calculating a likelihood of account take over or identity theft. Further, the fraud risk test may involve determining a likelihood that the interaction is an attempt to defraud by the first party.

The money laundering risk test may include anti-money laundering (AML) risk factors and AML surveillance. The money laundering risk test may involve calculating a risk score that considers foreign activity, rapid movement of funds, structuring, journals between unrelated accounts, large reportable transactions, escalations in inactive accounts, changes in behavior, high-risk transactions, networks of accounts, etc. The compliance risk test may include factors such as products and services as well as sales practice. The compliance risk test may involve determining a risk score based on product suitability and/or fiduciary responsibility of a sales practice.

Based on which risk tests are identified, the risk test scoring module 320 computes a set of risk scores based on the associated risk test rules stored in the risk test rules database 324. The risk test scoring module 320 calculates a risk score for each identified risk test. The user information database 328 includes user demographic information, account information, etc. The risk test scoring module 320 obtains variables from the user information database 328 according to the corresponding risk test rules to calculate the risk test scores.

In various implementations, the risk profile management device 112 receives the interaction parameters at the pattern recognition module 308 at the same time as the risk test identification module 304. The pattern recognition module 308 accesses known patterns stored in a pattern database 332. The pattern recognition module 308 recognizes any known patterns that are stored in the pattern database 332 that appear in the interaction parameters. The pattern database 332 may store patterns that have been identified as suspicious or fraudulent. In various implementations, the pattern database 332 includes patterns of interactions that were fraudulent.

The patterns included in the pattern database 332 are patterns identified by the machine learning algorithm, which is trained using a training set including historical interaction parameters of user interactions that resulted in fraudulent activity. In various implementations, the machine learning algorithms may be unsupervised to identify anomalies within historical interaction parameters. As is described below, interaction parameters can be categorized as high risk and interaction feedback from an analyst can confirm the user interaction as unacceptable so as to add the known interaction parameters to the training set to train the machine learning algorithm.

A similarity scoring module 336 receives the interaction parameters and the recognized patterns from the pattern recognition module 308 and determines how similar the patterns are based on a set of pattern rules stored in a pattern rules database 340. The pattern rules database 340 may include rules for each pattern parameter to calculate how similar each pattern is on a parameter level. For example, the pattern rules database 340 may dictate that certain parameters of particular patterns are more important for indicating similarity. Therefore, a similarity amongst a transaction amount, when the transaction amount is large, may be more indicative of fraud than an account type being used in the transaction. Therefore, the similarity scoring module 336 more heavily weighs the transaction amount of the user interaction as similar, as instructed by the pattern rules database 340.

An evaluation module 344 receives the risk test scores from the risk test scoring module 320, the similarity scores from the similarity scoring module 336, and the user risk profile from the risk profile database 316. The evaluation module 344 also obtains thresholds from a threshold database 348 to compare each risk score and similarity score in view of the user risk profile.

For example, for a user risk profile that is categorized as the lowest risk, the risk scores and similarity scores may be compared to the corresponding thresholds and adjusted based on the lower likelihood of risk. However, if a user risk profile suggests moderate or high risk, scores closer to the thresholds stored in the threshold database 348 may still be deemed intolerable and are adjusted to indicate that the risk is intolerable (for example, adjust the score to exceed the acceptable threshold). For example, a risk profile may indicate that each interaction must be reviewed manually since the user's risk profile is high risk. In various implementations, the evaluation module 344 may generate an overall risk score based on the adjustments and comparisons made to the individual risk scores.

The comparison or adjusted scores are forwarded to a categorization module 352. The categorization module 352 also receives the corresponding thresholds. Then, the categorization module 352 categorizes the scores into different risk categories including, for example, low, moderate, and high.

If each score is at least a predetermined distance from the corresponding threshold, the user interaction may be categorized as low risk. In a conservative implementation, if even one score is within a second predetermined distance from the corresponding threshold (that is, near), then the user interaction may be categorized as moderate risk. There may be varying degrees of how many scores need to be near the corresponding threshold to categorize the interaction as moderate risk. Then, if one (or more depending on the implementation) scores exceed the corresponding threshold, the user interaction may be categorized as high risk.

An action generation module 356 receives the category from the categorization module 352. The action generation module 356 forwards the user interaction, including the interaction parameters, risk scores, and similarity scores, to an update and review database 360. The update and review database provides the stored interaction parameters and scores to an update module 364 to adjust the user risk profile, score thresholds, and known patterns.

If the risk is low, the interaction parameters are forwarded to the update module 364 to update the risk profile database 316. A risk profile update module 368 receives an update instruction from the update module 364 to include the most recent user interaction in the user risk profile as a low risk interaction. The risk profile update module 368 may adjust risk scores included in the user risk profile based on the most recent user interaction, for example, by adding the risk scores and similarity scores of the most recent interaction into the average risk values of the user risk profile. When the risk is categorized as moderate and high, the user risk profile is also adjusted accordingly.

If the action generation module 356 receives an indication that the user interaction presents a moderate or high risk, the action generation module 356 may forward the indication to the update module 364 as well as an alert module 372. The update module 364 instructs a threshold update module 376 to update the threshold database 348 based on the most recent interaction scores to adjust the corresponding thresholds, for example, by averaging the risk scores and similarity scores into the stored threshold.

In various implementations, the update module 364 may only instruct the threshold update module 376 to adjust the thresholds in the threshold database 348 in response to receiving interaction feedback from an analyst that the moderate or high risk interaction was confirmed as intolerable risk or fraud. If interaction feedback is received that the user interaction was unacceptable or fraudulent, the update module 364 also instructs a pattern update module 380 to update the pattern database 332 to include the interaction parameters of the corresponding user interaction that was unacceptable. Similarly, if the interaction feedback indicates the user interaction was unacceptable or fraudulent, the user risk profile is updated to indicate that verified unacceptable activity occurred, and the user risk profile scores are adjusted according to the type of risk presented.

The action generation module 356 generates and forwards alerts for user interactions that are categorized as moderate risk or high risk. The alert module 372 determines whether to send a pause or cancel transaction instruction for those interactions that are high risk or send a review instruction for those interactions that pose moderate risk. If a review alert is sent for the user interaction, an analyst can access the user interaction from the update and review database 360.

Figure 4:
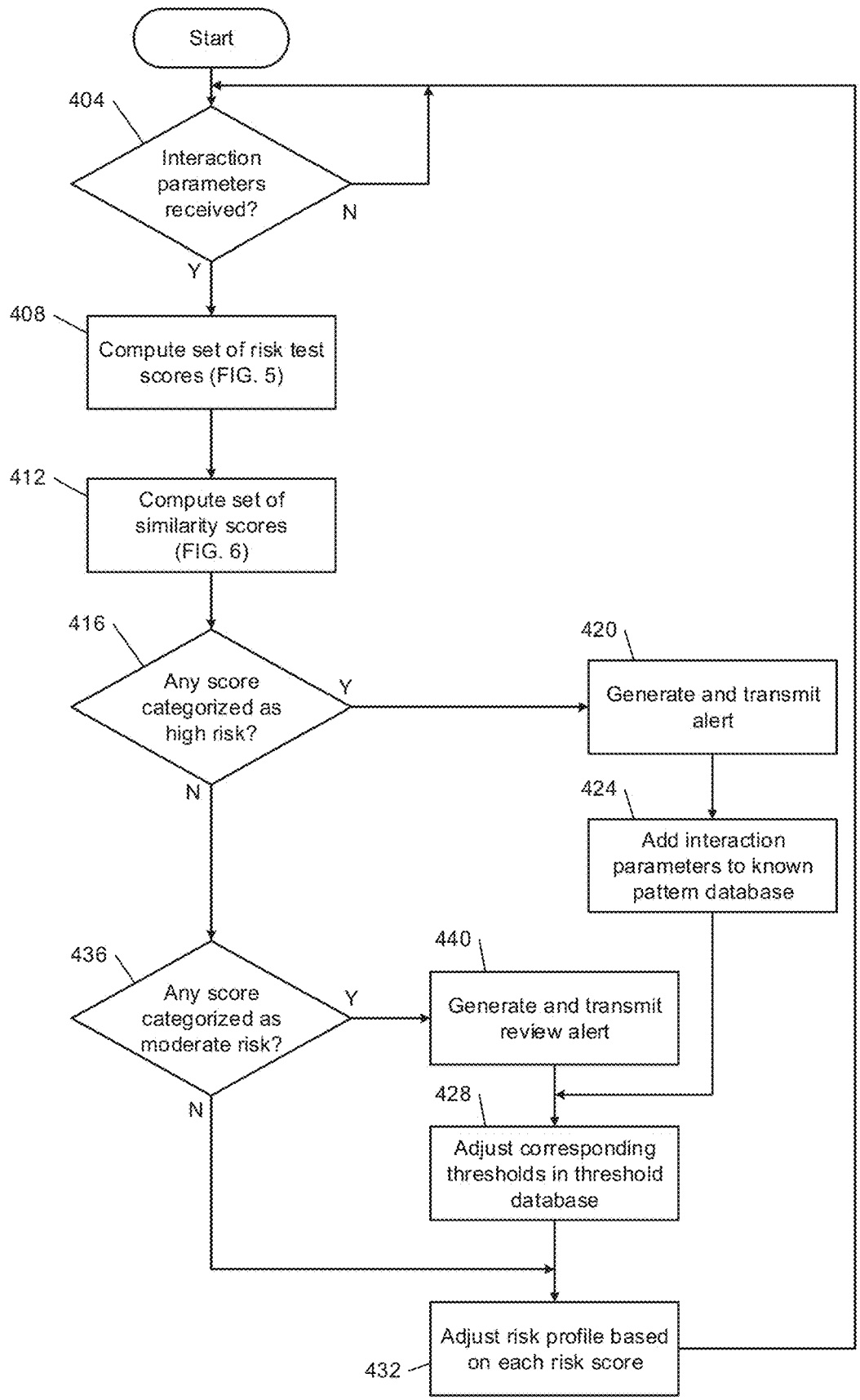
FIG. 4 is a flowchart depicting example user interaction analysis and intolerable risk identification according to the principles of the present disclosure.

FIG. 4 is a flowchart depicting example user interaction analysis and intolerable risk identification according to the principles of the present disclosure. Control begins at 404 to determine if interaction parameters of a user interaction have been received. The user interaction may include performing a transaction (online, over the phone, in person), opening an account, contacting an entity associated with the account, clicking on a website associated with the account, etc. Each user interaction assists in the construction of a corresponding user risk profile. These user risk profiles may be used to determine whether a present user interaction suggests the user interaction may result in an intolerable risk or may be fraudulent.

If interaction parameters have not been received, control waits. Otherwise, control proceeds to 408 to compute a set of risk test scores, which is described in the flowchart of FIG. 5. Once the set of risk test scores are computed, control proceeds to 412 to compute a set of similarity scores, which is described in the flowchart of FIG. 6. In various implementations, the flowchart of FIG. 5 and the flowchart of FIG. 6 may be in the reverse order or run concurrently. Once the sets of scores are computed, control continues to 416 to determine whether any scores (including the set of risk test scores and the set of similarity scores) were categorized as high risk. In various implementations, control may require a predetermined number of scores to be categorized as high risk.

If at least one score of the user interaction is categorized as high risk, control proceeds to 420 to generate and transmit an alert to an analyst device, such as in a pop-up window. In various implementations, the alert may add the user interaction to a review database and pause the interaction until an analyst reviews and approves the interaction. In other implementations, a cancellation request may also be generated with the alert to simply cancel the user interaction, for example, if the user interaction is a transaction that indicates fraud.

Figure 5:
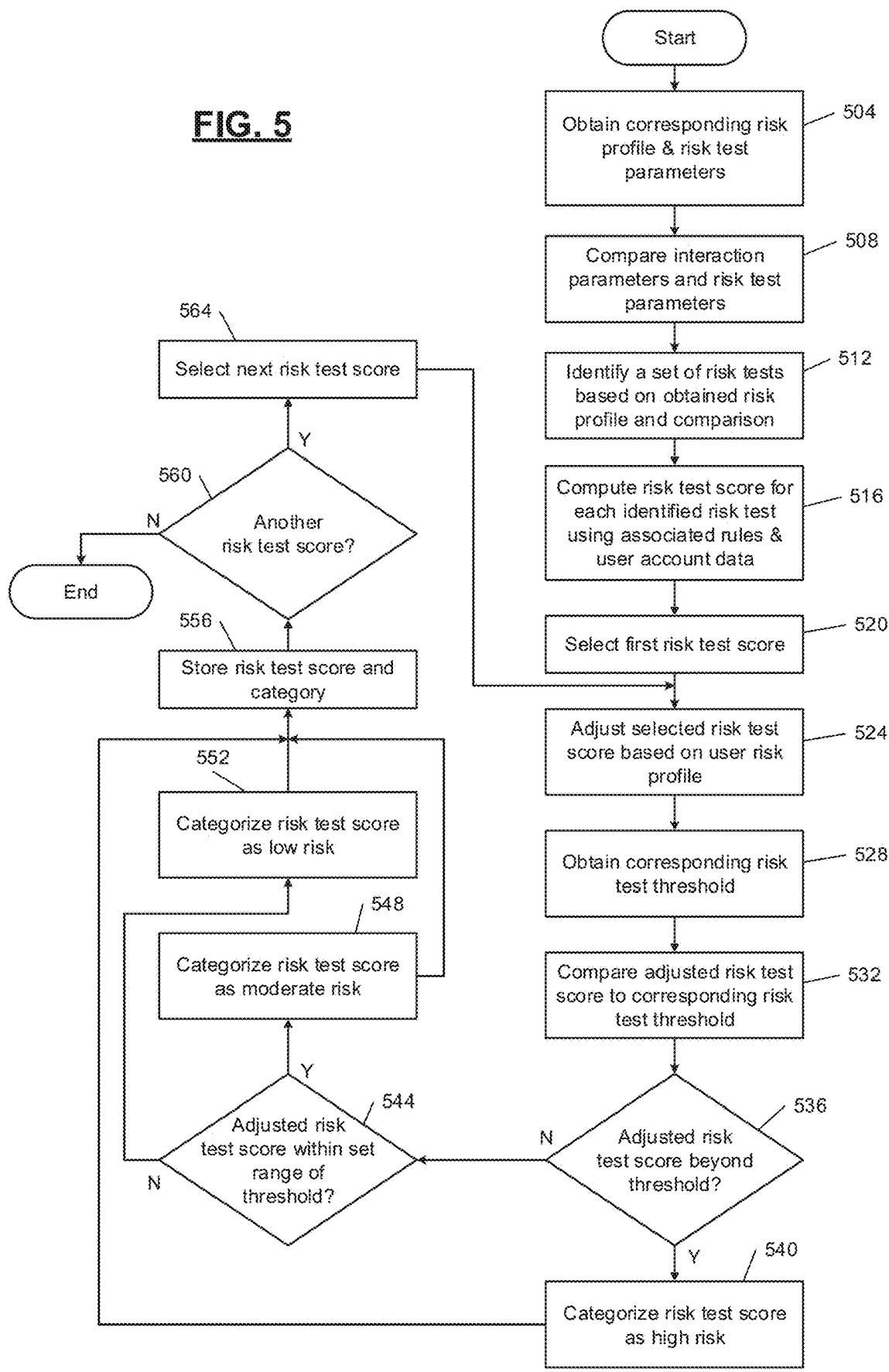
FIG. 5 is a flowchart depicting example risk score determination according to the principles of the present disclosure.
Figure 6:
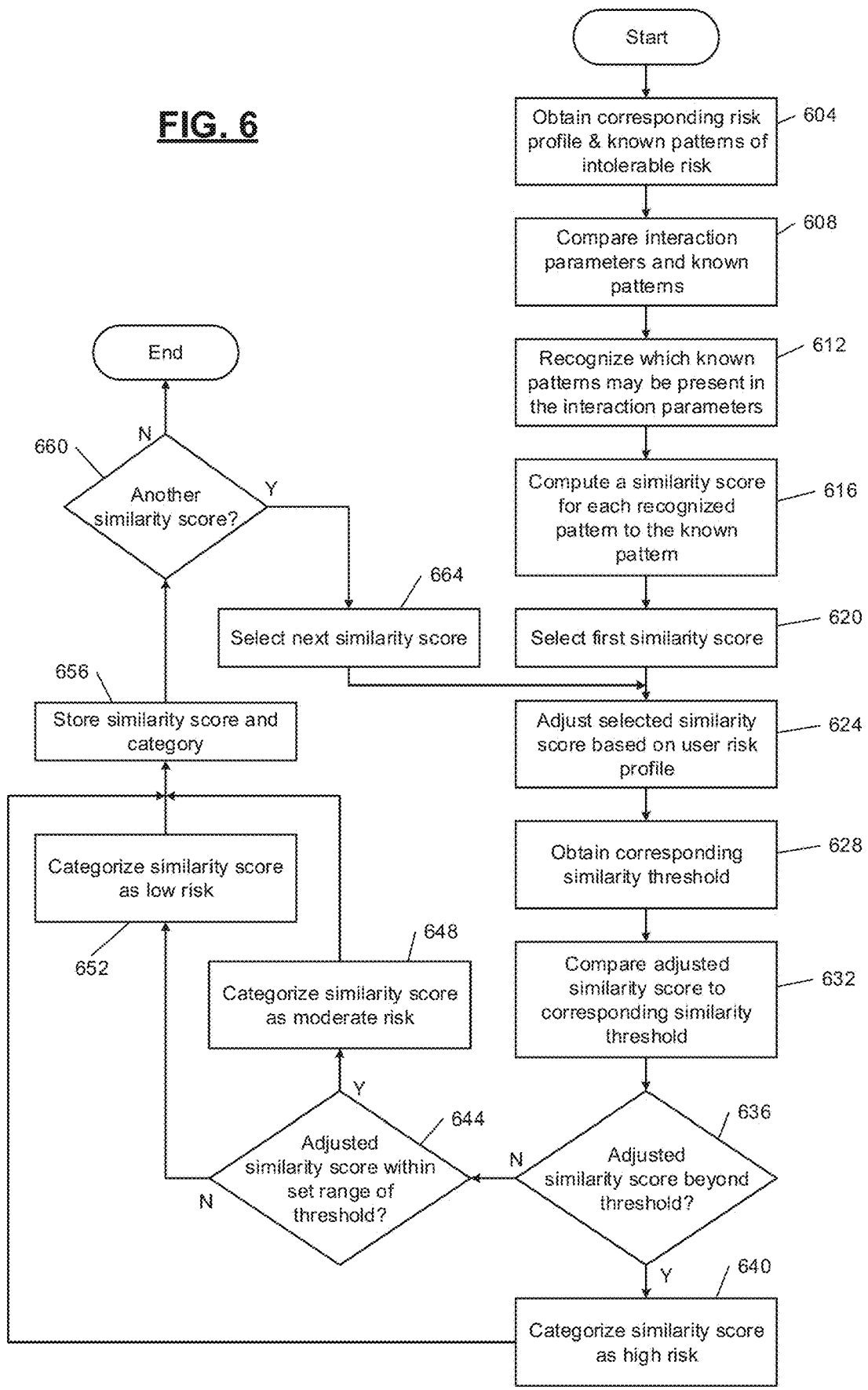
FIG. 6 is a flowchart depicting example similarity score determination according to the principles of the present disclosure.

Control then proceeds to 424 to incorporate the interaction parameters into a known pattern database that is generated using guided machine learning, used in FIG. 6 to identify similar patterns. In various implementations, control only incorporates the interaction parameters into the known pattern database after receiving feedback from an analyst verifying that the high risk user interaction is unacceptable. Then, control proceeds to 428 to adjust corresponding thresholds in the threshold database. As described in the flowcharts of FIG. 5 and FIG. 6, the threshold database stores thresholds for categorizing scores. Therefore, each threshold corresponding to the computed scores may be adjusted based on the score.

For example, if the computed scores indicate high risk or moderate risk, the thresholds may be adjusted to result in a lower tolerance (resulting in a larger high and moderate risk range), since the user interaction is considered risky. Adjusting the thresholds based on the number of moderate or high risk scores being processed results in the categorization process being influenced by how many risky transactions are being identified. In various implementations, the thresholds may be set values that are not adjusted for each user interaction.

Control continues to 432 to also adjust the corresponding risk profile of the user performing the interaction based on each computed risk score. Therefore, each interaction performed by the user is incorporated into that user's risk profile to add to the interactions that are not risky or to update the user's risk profile to reflect the amount of risk the user presents to the entity. Then, control returns to 404 to wait for additional interaction parameters.

Returning to 416, if no score is categorized as high risk, control proceeds to 436 to determine if any score was categorized as moderate risk. If yes, control proceeds to 440 to generate and transmit a review alert. For example, the user interaction may be flagged and added to a review queue for an analyst to review after the user interaction has occurred. Both high risk and moderate risk interactions are stored or held for review. The to be reviewed interactions may be color coded to indicate risk category. Then, control proceeds to 428 to adjust stored thresholds. Otherwise, if the score is not categorized as moderate risk, the interaction parameters have indicated a low risk user interaction is occurring. The interaction parameters proceed to 432 to be added to the user's risk profile.

FIG. 5 is a flowchart depicting example risk score determination according to the principles of the present disclosure. Control begins to compute the set of risk scores at 504. At 504, control obtains a risk profile corresponding to the interaction parameters and risk test parameters. At 508, control compares interaction parameters and risk test parameters. At 512, control identifies a set of risk tests based on the obtained risk profile and the comparison of 508. The set of risk tests includes risk tests that are relevant to the user interaction being performed based on the interaction parameters and the risk test parameters of each test. As described previously, every risk test may not be relevant to the user interaction being performed; therefore, control identifies which risk tests are relevant to the user interaction.

At 516, control computes a risk test score for each identified risk test using the associated rules and user account data. A risk test database stores a variety of business rules for each risk test to compute the risk test score for each identified risk test. At 520, a first risk test score is selected. Control continues to 524 to adjust the selected risk test score based on the corresponding user profile. For example, if the selected risk test score of the interaction parameters is calculated for fraud risk, control considers the user risk profile of the user performing the user interaction. If the corresponding user risk profile indicates a high risk of unacceptable or fraudulent activity, then the selected risk test score may be adjusted since this particular user is at a higher risk of conducting or being exposed to fraudulent activity.

Control continues to 528 to obtain the corresponding risk test threshold. At 532, control compares the adjusted risk test score to the corresponding risk test threshold. Control continues to 536 to determine if the adjusted risk test score is beyond the corresponding risk test threshold. If yes, control proceeds to 540 to categorize the risk test score as high risk. Otherwise, control continues to 544 to determine whether the adjusted risk test score is within a set range of the corresponding threshold. If yes, control proceeds to 548 to categorize the risk test score as a moderate risk. Otherwise, control continues to 552 to categorize the risk test score as a low risk. After the risk test score is categorized, control proceeds to 556 to store the risk test score and category. At 560, control determines if another risk test score exists. If yes, control continues to 564 to select the next risk test score and return to 524. Otherwise, control ends.

FIG. 6 is a flowchart depicting example similarity score determination according to the principles of the present disclosure. Control begins to compute the set of similarity scores at 604. Control obtains, at 604, a risk profile corresponding to the interaction parameters of the user interaction and known patterns of intolerable risk. The known patterns are constructed from historical user interactions that resulted in an unacceptable amount of risk or were fraudulent. Using a machine learning algorithm, the interaction parameters of known user interactions are analyzed to identify certain patterns resulting from the instances of intolerable risk. The machine learning algorithm is guided according to the specific historical interaction parameters. As described above, in various implementations, the machine learning algorithm could implement unsupervised anomaly detection within the historical user interactions.

At 608, control compares the interaction parameters and known patterns. Control continues to 612 to recognize which known patterns may be present in the user interaction, indicated by the interaction parameters. At 616, control computes a similarity score for each recognized pattern. The similarity score is a score between the interaction parameters and recognized pattern. Control continues to 620 to select a first similarity score. At 624, control adjusts the selected similarity score based on the corresponding user risk profile. For example, if the user risk profile indicates that the particular user is susceptible to intolerably risky activity or fraud, control may adjust the similarity score to reflect a higher likelihood of the interaction parameters being similar to intolerable risk.

Control continues to 628 to obtain corresponding similarity thresholds. At 632, control compares the adjusted similarity score to the corresponding similarity threshold. At 636, control determines if the adjusted similarity score is beyond the corresponding similarity threshold. If yes, control proceeds to 640 to categorize the similarity score as high risk. Otherwise, control proceeds to 644 to determine if the adjusted similarity score is within a set range of the corresponding similarity threshold. If yes, control proceeds to 648 to categorize the similarity score as a moderate risk. Otherwise, control continues to 652 to categorize the similarity score as a low risk.

After the similarity score is categorized, control proceeds to 656 to store the similarity score and category. At 660, control determines whether another similarity score exists. If yes, control continues to 664 to select the next similarity score and return to 624. Otherwise, control ends.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
at least one processor; and
at least one memory, wherein the memory stores a test database, a pattern database, and a profile database;
the at least one memory configured to, with the at least one processor, cause the system to perform, in response to receiving interaction parameters of an interaction,
obtaining a risk profile from the profile database,
obtaining risk test parameters from the test database,
identifying a test from the test database based on the risk test parameters and the interaction parameters,
determining a risk test score based on rules of the test and the interaction parameters,
adjusting the risk test score based on the risk profile,
obtaining pattern parameters from the pattern database,
identifying a pattern from the pattern database based on the pattern parameters and the interaction parameters,
determining a similarity score between the interaction parameters and the identified pattern, and
adjusting the similarity score based on the risk profile.

2. The system of claim 1, wherein the system is further caused to perform:
obtaining at least one risk test threshold from a threshold database; and
categorizing a level of risk of the risk test score based on the risk test score and the at least one risk test threshold.

3. The system of claim 2, wherein the categorizing categorizes the risk test score as low risk if the risk test score is less than a first risk test threshold.

4. The system of claim 3, wherein the categorizing categorizes the risk test score as moderate risk if the risk test score is greater than the first risk test threshold and less than a second risk test threshold.

5. The system of claim 4, wherein the categorizing categorizes the risk test score as high risk if the risk test score is greater than the second risk test threshold.

6. The system of claim 5, wherein the system is further caused to perform, in response to the risk test score being categorized as moderate risk or high risk, generating and transmitting an alert.

7. The system of claim 1, wherein the system is further caused to perform:
obtaining at least one similarity threshold from a threshold database; and
categorizing a level of similarity of the similarity score based on the similarity score and at least one similarity threshold.

8. The system of claim 7, wherein the categorizing categorizes the similarity score as low risk if the similarity score is less than a first similarity threshold.

9. The system of claim 8, wherein the categorizing categorizes the similarity score as moderate risk if the similarity score is greater than the first similarity threshold and less than a second similarity threshold.

10. The system of claim 9, wherein the categorizing categorizes the similarity score as high risk if the similarity score is greater than the second similarity threshold.

11. The system of claim 10, wherein the system is further caused to perform, in response to the similarity score being categorized as moderate risk or high risk, generating and transmitting an alert.

12. The system of claim 10, wherein the system is further caused to perform in response to the similarity score being categorized as high risk and receiving interaction feedback indicating the interaction is fraudulent, updating known patterns of the pattern database based on a machine learning algorithm guided by the interaction parameters.

13. The system of claim 12, wherein the known patterns are constructed from historical interaction parameters of interactions.

14. The system of claim 12, wherein the known patterns are constructed by the machine learning algorithm and the machine learning algorithm is trained using historical interactions confirmed as being high risk.

15. The system of claim 1, wherein the system is further caused to perform updating the risk profile to incorporate the risk test score and the similarity score.

16. The system of claim 1, wherein the system is further caused to perform:
storing the interaction and the interaction parameters in a review database for manual review; and
pausing the interaction until the manual review is complete.

17. The system of claim 16 wherein the interaction parameters include metadata that indicates a unique device that initiated a transaction and a geographical location of the unique device upon initiation of the transaction.

18. The system of claim 17, wherein the system is further caused to perform reviewing the interaction parameters for a plurality of interactions to identify one or more anomalies among the plurality of interactions.

19. The system of claim 1, wherein the risk profile includes a user risk score for one or more categories of risk.

20. The system of claim 19, wherein each of the user risk scores is determined from historical user interactions.

* * * * *